US009428419B2

(12) United States Patent
Seidl et al.

(10) Patent No.: US 9,428,419 B2
(45) Date of Patent: Aug. 30, 2016

(54) CEMENTITIOUS SYSTEM COMPRISING ACCELERATOR PARTICLES COATED WITH CROSSLINKED SHELLAC

(71) Applicant: Construction Research & Technology, GmbH, Trostberg (DE)

(72) Inventors: Wolfgang Seidl, Palling (DE); Steffen Wache, Breitbrunn (DE); Werner Stohr, Augsburg (DE); Siegfried Zürn, Eurasburg (DE); Joachim Riedmiller, Friedberg (DE); Volker Schwarz, Augsburg (DE)

(73) Assignee: Construction Research & Technology GmbH, Trostberg (DE)

( * ) Notice: Subject to any disclaimer, the term of this patent is extended or adjusted under 35 U.S.C. 154(b) by 0 days.

(21) Appl. No.: 14/893,194

(22) PCT Filed: May 21, 2014

(86) PCT No.: PCT/EP2014/060406
§ 371 (c)(1),
(2) Date: Nov. 23, 2015

(87) PCT Pub. No.: WO2014/198505
PCT Pub. Date: Dec. 18, 2014

(65) Prior Publication Data
US 2016/0122245 A1 May 5, 2016

(30) Foreign Application Priority Data

Jun. 14, 2013 (EP) ..................................... 13171949

(51) Int. Cl.
*C04B 20/12* (2006.01)
*C04B 24/34* (2006.01)
(Continued)

(52) U.S. Cl.
CPC ............... *C04B 24/34* (2013.01); *C04B 14/06* (2013.01); *C04B 20/104* (2013.01); *C04B 20/12* (2013.01);
(Continued)

(58) Field of Classification Search
CPC ..... C04B 28/02; C04B 28/021; C04B 28/24; C04B 28/06; C04B 28/065; C04B 28/14; C04B 12/04; C04B 14/22; C04B 14/28; C04B 20/1037; C04B 20/104; C04B 20/107; C04B 20/12; C04B 22/0086; C04B 22/0093; C04B 22/085; C04B 22/124; C04B 22/147; C04B 22/148; C04B 40/0608; C04B 40/065; C04B 7/02; C04B 7/32; C04B 7/323; C04B 14/06; C04B 24/34; C04B 2103/0062; C04B 2103/10; C04B 2103/14
See application file for complete search history.

(56) References Cited

U.S. PATENT DOCUMENTS 3,909,444 A 9/1975 Anderson et al.
4,349,386 A 9/1982 Davidovits
(Continued)

FOREIGN PATENT DOCUMENTS

DE 37 04 783 A1 8/1988
GB 1 579 356 11/1980
(Continued)

OTHER PUBLICATIONS

PCT/EP2014/060406—International Search Report, mailed Aug. 13, 2014.
(Continued)

*Primary Examiner* — Anthony J Green
(74) *Attorney, Agent, or Firm* — Curatolo Sidoti Co., LPA; Joseph G. Curatolo; Salvatore A. Sidoti (57) ABSTRACT

A proposal is made for a cementitious system which comprises accelerator particles coated with crosslinked shellac, for the use as an additive component which comprises the accelerator particles coated with crosslinked shellac, and for a cement slurry which comprises the cementitious system and water.

20 Claims, 4 Drawing Sheets

(51) Int. Cl.
*C04B 28/02* (2006.01)
*C04B 28/04* (2006.01)
*C04B 28/06* (2006.01)
*C04B 28/14* (2006.01)
*C04B 20/10* (2006.01)
*C04B 14/06* (2006.01)
*C04B 22/14* (2006.01)
*C04B 103/00* (2006.01)
*C04B 103/10* (2006.01)
*C04B 103/14* (2006.01)

(52) U.S. Cl.
CPC .............. *C04B 22/147* (2013.01); *C04B 28/02* (2013.01); *C04B 28/021* (2013.01); *C04B 28/04* (2013.01); *C04B 28/06* (2013.01); *C04B 28/065* (2013.01); *C04B 28/14* (2013.01); *C04B 2103/0062* (2013.01); *C04B 2103/10* (2013.01); *C04B 2103/14* (2013.01)

(56) References Cited

U.S. PATENT DOCUMENTS

| | | | |
|---|---|---|---|
| 4,472,199 A | 9/1984 | Davidovits | |
| 4,509,985 A | 4/1985 | Davidovits et al. | |
| 5,472,498 A | 12/1995 | Stephenson et al. | |
| 5,709,945 A | 1/1998 | Lee et al. | |
| 6,620,431 B1 | 9/2003 | Signorino | |
| 6,787,234 B2 | 9/2004 | Tijsma et al. | |
| 6,840,318 B2 | 1/2005 | Lee et al. | |
| 7,429,392 B2 | 9/2008 | Baum et al. | |
| 7,896,068 B2 | 3/2011 | Lee | |
| 8,047,282 B2 | 11/2011 | Lewis et al. | |
| 8,460,459 B2 | 6/2013 | Ellenrieder et al. | |
| 2003/0234103 A1 | 12/2003 | Lee et al. | |
| 2004/0081827 A1 | 4/2004 | Datta et al. | |
| 2004/0234603 A1 | 11/2004 | Baum et al. | |
| 2008/0305137 A1 | 12/2008 | Baum et al. | |
| 2011/0002986 A1 | 1/2011 | Durig et al. | |
| 2014/0299024 A1 | 10/2014 | Seidl et al. | |

FOREIGN PATENT DOCUMENTS

| | | |
|---|---|---|
| JP | 2002 284555 A | 10/2002 |
| JP | 2010 180065 A | 8/2010 |
| RU | 2307145 C1 | 9/2007 |
| WO | WO 85/03699 A1 | 8/1985 |
| WO | WO 85/05351 | 12/1985 |
| WO | WO 04/000953 A1 | 12/2003 |
| WO | WO 2013/087391 A1 | 6/2013 |

OTHER PUBLICATIONS

PCT/EP2014/060406—International Written Opinion, mailed Aug. 13, 2014.
PCT/EP2014/060406—International Preliminary Report on Patentability, Sep. 7, 2015.
Bilancetti, et al., "Particle coating using dry powder technology", PARTEC 2007 Conference, Mar. 27, 2007, pp. 5-8, Germany.
Farag, et al., "Physiochemical properties of various shellac types", Dissolution Technologies, May 2009, pp. 33-39.
Cheung, J., et al., "Impact of Admixtures on the Hydration Kinetics of Portland Cement", Cement and Concrete Research, Dec. 2011, pp. 1289-1309, vol. 41, Issue 12. (Abstract only).
Yassin Farag, Thesis, "Characterization of different shellac types and development of shellac-coated dosage forms", 2010.

CEMENTITIOUS SYSTEM COMPRISING ACCELERATOR PARTICLES COATED WITH CROSSLINKED SHELLAC

CROSS REFERENCE TO RELATED APPLICATIONS

This application is a national stage application of International Application No. PCT/EP2014/060406, filed 21 May 2014, which claims priority from European Patent Application No. 13171949.4, filed 14 Jun. 2013, which applications are incorporated herein by reference.

The present invention relates to a cementitious system which comprises accelerator particles coated with crosslinked shellac, to the use of an additive component which comprises the accelerator particles coated with crosslinked shellac, and to a cement slurry which comprises the cementitious system and water.

The processing profile of a cementitious system in the application is of key importance since it critically influences the processing process and the construction progress.

The acceleration of a cementitious system, which may relate to the stiffening/solidification and/or to the hardening of the system, is achieved in accordance with the prior art by addition of various accelerator admixtures. Examples of accelerators frequently used include calcium chloride, calcium formate and aluminum sulphate (P. Hewlett, Lea's Chemistry of Cement and Concrete, Chapter 15.6, 4th edition, 1988, Elsevier, or J. Cheung et al., Cement and Concrete Research 41, 2011, 1289-1309). Depending on activity and dosage, however, the addition of accelerators may shorten the processing life of a cementitious system to such an extent that it can no longer be processed, since the accelerator becomes active immediately after the batching water has been added. For this reason, certain accelerators, as for example sodium metaaluminate ($NaAlO_2$), can virtually not be used in cementitious systems, since they bring about much too rapid stiffening.

If no accelerator is used, the processing life in cementitious systems is indeed sufficiently long, that the slow stiffening/solidification delays construction progress. Achieving both effects together—that is, long processing and rapid stiffening/hardening—is difficult with commonplace accelerators in cementitious systems, especially when effective accelerators are to be used.

To ensure a sufficient processing life in cementitious systems despite the use of an accelerator, accelerators have for various applications been encapsulated. A common feature of the prior art with regard to encapsulated accelerators is that release of the accelerator requires a separate, external initiating event—for example, a temperature change (JP2002284555A1, U.S. Pat. No. 6,840,318B2, GB1579356, U.S. Pat. No. 7,896,068B2), ultrasound (U.S. Pat. No. 8,047,282B2) or a pH change (RU2307145C). However, there are a range of cementitious systems which no longer can be and should be influenced from the outside after application, such as various dry mortars, for example.

For cementitious systems of these kinds, an internal initiator is then needed, which, while being activated by the water mixing process, does not actually release the accelerator until after a certain time has elapsed. In addition, it ought to be possible for the release time to be altered controllably within certain limits, in order to be able to adapt it for different applications.

According to the prior art, one suitable internal trigger mechanism is the build-up of osmotic pressure within a coated particle, leading, after a certain time, as a result of the swelling within the core, to the coating breaking open, thereby providing rapid release of active ingredient. A number of such systems are known in the pharmaceutical sector, as for example from T. Ghosh et al., Journal of Applied Pharmaceutical Science, 1, 2011, pp. 38-49 or B. Amsden, J. Pharm. Pharmaceut. Sci., 10, 2007, pp. 129-143, but this concept cannot be transposed to a cementitious system with pH levels of 12 to 13, since under such conditions coatings of these kinds are no longer assured of their functionality.

In our previous International Patent Application WO 2013/087391 A1 (priority: 16 Dec. 2011, publication: 20 Jun. 2013) coated particles of an active ingredient are described, having controllable release properties at pH levels of 10-14, the active ingredient being selected from one or more chemical construction additives for the influencing of an inorganic binder, the particles being characterized in that their coating comprises shellac. WO 2013/087391 A1, however, does not mention cementitious systems comprising such accelerator particles, and in particular does not mention one-component cementitious systems, such as dry mortars comprising accelerator particles coated with crosslinked shellac, the use of an additive component which comprises the accelerator particles coated with crosslinked shellac, or a cement slurry which comprises said cementitious system and water.

The object on which the present invention is based is that of substantially avoiding the disadvantages of the outlined prior art. The intention to modify an accelerator in such a way that when it is present in a cementitious system, a long processing life in combination with accelerated stiffening/hardening is fulfilled. The intention more particularly was to provide cementitious systems suitable for achieving this object.

The object stated above has been solved with the features of the independent claims. The dependent claims relate to preferred embodiments. More particularly, the object identified above has been achieved in accordance with the invention by first shaping an accelerator into particles and thereafter applying a coating of shellac, which has subsequently been crosslinked. These accelerator particles coated with crosslinked shellac are then employed as part of a cementitious system.

The present invention accordingly first provides a cementitious system comprising a cementitious component and accelerator particles coated with crosslinked shellac, characterized in that the coated accelerator particles are either present together with the cementitious component in the form of a one-component formulation; or in the form of an additive component which is held separately from the cementitious component.

With other words, the term "system" is meant to designate either a one-component formulation or a two or multicomponent kit of parts. Moreover, in contrast to our aforementioned WO 2013/087391 A1, the cementitious system of the invention requires the presence of a cementitious component. The accelerator particles coated with crosslinked shellac may be present in the form of a one-component formulation together with in the cementitious component or may be held separately from the cementitious component.

In case of a one-component formulation, the cementitious system of the invention is preferably a dry mortar. The inorganic binder used in such a dry mortar is preferably a portland cement.

Shellac is a natural substance which is obtained from the secretions of the lac scale insect (*Kerria lacca*) by a variety of cleaning/purifying operations. From a chemical standpoint, shellac is an oligomeric ester composed of about 8 monomeric units, with a free carboxylic acid group at one end of the oligomer. One half of the monomer consists of 9,10,16-trihydroxypalmitic acid, also referred to as aleuritic acid. The other half consists of various terpene acids, which may carry further, different chemical groups. The free carboxyl group content of the shellac is defined by what is called the acid number, corresponding to the amount of potassium hydroxide needed to neutralize one gram of shellac. The acid number is expressed in mg potassium hydroxide/g shellac and for many shellacs is around 70 mg/g. Deprotonation of the carboxylic acid renders shellac water-soluble, and accordingly it may be obtained in the form of an ammoniacal aqueous solution having a solids fraction of around 25%, from Harke Group, Mühlheim an der Ruhr, Germany, for example, under the designation "Aquagold®". Alternatively, the same type of shellac in powder form may be acquired, for example, from Stroever, Bremen, Germany, with the type designation "SSB 57", and may be dissolved in ammoniacal solution with stirring and gentle heating.

The physical shaping of the accelerator into round or near-round and smooth particles is the basis for a high-quality coating with uniform film thickness and homogeneous reaction characteristics. If the accelerator particles after shaping have angles, edges or holes, it is impossible to achieve a uniform coating thickness in the subsequent coating operation, and this may result, consequently, in non-uniform release of the accelerator. The acceptable roughness of the accelerator particles will be defined hereinbelow.

The coating of the accelerator particles with crosslinked shellac ensures that under the alkaline conditions of the cementitious system they break open after a certain time, as a result of the build-up of osmotic pressure in the interior of the particles, and release the accelerator. As a result of the coating, for a certain time after the mixing of the cementitious system with water, no accelerator is released, and so the processing properties are initially unaffected. Moreover, the partial dissolving of the accelerator during the osmotic pressure build-up produces, after its release, a rapid reaction with the surrounding cementitious matrix.

The advantageous achieved by the present invention are therefore in particular that through the use of accelerator particles coated with crosslinked shellac, the processing properties of a cementitious system are initially not impaired, but in the further course, as a result of the release of the accelerator, a rapid stiffening/solidifying is obtained. Furthermore, by varying the release time of the coated accelerator particles, it is possible to tailor the stiffening/solidifying of a cementitious system so as to create further room for manoeuvre in the formulation of cementitious systems. Another advantage is that the release is triggered by an internal mechanism, thereby allowing the cementitious system of the invention to be applied like a conventional cementitious system, without the need for further, external triggers.

The cementitious system of the invention usefully comprises an inorganic binder selected from portland cement, fused alumina cement, calcium sulphoaluminate cement, portland composite cement according to classes CEM II to V, hydraulic binders, latent hydraulic binders, pozzolanic binders, alkali-activatable aluminosilicate binders and gypsum, and also mixtures thereof.

Portland cement is probably the best-known hydraulic binder. It was first referred to in British Patent BP 5022 and since then has undergone continual further development. Modern portland cement contains about 70 wt % CaO+ MgO, about 20 wt % $SiO_2$ and about 10 wt % $Al_2O_3+Fe_2O_3$.

In addition there are composite cements based on portland cement and various co-components, the composition of these cements being regulated in DIN EN 197-1, Table 1, and the cements themselves being assigned to cement classes CEM II portland composite cement, CEM III blast furnace cement, CEM IV pozzolanic cement and CEM V composite cement V. Co-components used include slag sand, fly ash, pozzolan, trass, silica dust, limestone, et cetera. Common to these cements is that as a result of the portland cement fraction, after being stirred up with water, they feature a basic medium.

Certain slags from metallurgical processes may be used as admixtures in so-called portland composite cements, which are likewise part of the family of hydraulic binders. Very generally, hydraulic binders are inorganic binders which still cure even under water.

Latent hydraulic binders may be selected, for example, from slags, more particularly from blast furnace slag, granulated blast furnace slag, ground granulated blast furnace slag, electrothermal phosphorus slag, steel slag, and mixtures thereof. These slags may be either industrial slags, i.e. waste products from industrial operations, or slags reproduced synthetically. The latter is advantageously the case, since industrial slags are not always available in consistent quantity and quality. For the purposes of the present invention, a latent hydraulic binder means preferably an inorganic binder in which the molar ratio of $(CaO+MgO):SiO_2$ is between 0.8 and 2.5 and more preferably between 1.0 and 2.0.

Blast furnace slag is a waste product of the blast furnace process. Granulated blast furnace slag is blast furnace slag that has been granulated, and ground granulated blast furnace slag is produced from granulated blast furnace slag by fine pulverization. Depending on origin and form of preparation, the ground granulated blast furnace slag varies in its fineness and grain size distribution, with the fineness influencing the reactivity. A characteristic variable employed for the fineness is the Blaine value, which is typically of the order of 200 to 1000, preferably between 300 and 500 $m^2$ $kg^{-1}$. The finer the grind, the higher the reactivity. The typical composition of blast furnace slag has already been mentioned above. Blast furnace slag contains generally 30 to 45 wt % CaO, about 4 to 17 wt % MgO, about 30 to 45 wt % $SiO_2$ and about 5 to 15 wt % $Al_2O_3$, typically about 40 wt % CaO, about 10 wt % MgO, about 35 wt % $SiO_2$ and about 12 wt % $Al_2O_3$.

Electrothermal phosphorus slag is a waste product from the production of phosphorus by an electrothermal process. It is less reactive than blast furnace slag and contains about 45 to 50 wt % CaO, about 0.5 to 3 wt % MgO, about 38 to 43 wt % $SiO_2$, about 2 to 5 wt % $Al_2O_3$ and about 0.2 to 3 wt % $Fe_2O_3$ and also fluoride and phosphate. Stainless steel slag is a waste product of various steel producing processes, with a highly varying composition (see Caijun Shi, Pavel V. Krivenko, Della Roy, Alkali-Activated Cements and Concretes, Taylor & Francis, London & New York, 2006, pp. 42-51).

Inorganic binder systems based on reactive, water-insoluble compounds on the basis of $SiO_2$ in conjunction with $Al_2O_3$, which cure in an aqueous alkaline medium, are likewise common knowledge. Cured binder systems of this kind are also referred to as "alkali-activatable alumosilicate binders" or "geopolymers" and are described for example in U.S. Pat. No. 4,349,386, WO 85/03699 and U.S. Pat. No. 4,472,199. As a reactive oxide mixture here it is possible, as well as slags, to use pozzolanic binders such as metakaolin, fly ashes, activated clay or mixtures thereof, for example. The alkaline medium for activating the binder consists commonly of aqueous solutions of alkali metal carbonates, alkali metal fluorides, alkali metal hydroxides and/or soluble waterglass. EP2504296 A1 describes systems in which the binder cures in the form of a hybrid matrix in which a calcium silicate hydrate matrix and a geopolymer matrix are present in a suitable ratio to one another and interpenetrate one another in such a way that the overall matrix is both acid-resistant and alkali-resistant.

The pozzolanic binder is selected for example from amorphous silica, preferably precipitated silica, pyrogenic silica and microsilica, finely ground glass, fly ash, preferably brown-coal fly ash and mineral coal fly ash, metakaolin, natural pozzolans such as tuff, trass and vulcanic ash, natural and synthetic zeolites, and mixtures thereof. An overview of pozzolanic binders suitable in accordance with the invention is given for example in Caijun Shi, Pavel V. Krivenko, Della Roy, Alkali-Activated Cements and Concretes, Taylor & Francis, London & New York, 2006, pp. 51-63. Testing for pozzolanic activity can take place in accordance with DIN EN 196 Part 5.

The amorphous silicas are preferably X-ray-amorphous silicas, i.e. a silica which does not exhibit crystallinity in the powder diffraction process. For the purposes of the present invention, finely ground glass is likewise considered an amorphous silica. The amorphous silica of the invention usefully has an $SiO_2$ content of at least 80 wt %, preferably at least 90 wt %. Precipitated silica is obtained industrially via precipitation processes starting from waterglass. According to the production process, precipitated silica is also called silica gel. Pyrogenic silica is generated by reaction of chlorosilanes such as silicon tetrachloride, for example, in an oxyhydrogen flame. Pyrogenic silica is an amorphous $SiO_2$ powder with a particle diameter of 5 to 50 nm and a specific surface area of 50 to 600 $m^2\ g^{-1}$.

Microsilica is a by-product of silicon or ferrosilicon production and likewise consists very largely of amorphous $SiO_2$ powder. The particles have diameters in the size order of 0.1 μm. The specific surface area is in the size order of 15 to 30 $m^2\ g^{-1}$. In contrast, commercial silica sand is crystalline and by comparison has large particles and a comparatively small specific area. In accordance with the invention it serves as an inert adjuvant.

Fly ashes are formed in processes including the combustion of coal in power stations. Class C fly ash contains, in accordance with WO 08/012438, about 10 wt % CaO, whereas class F fly ashes contain less than 8 wt %, preferably less than 4 wt % and typically about 2 wt % CaO.

Metakaolin is formed in the dehydrogenation of kaolin. Whereas kaolin gives up physically bonded water at 100 to 200° C., at 500 to 800° C. there is a dehydroxylation, with collapse of the lattice structure and formation of metakaolin ($Al_2Si_2O_7$). Pure metakaolin, accordingly, contains about 54 wt % $SiO_2$ and about 46 wt % $Al_2O_3$.

The collective designation "gypsum" comprehends the modifications $CaSO_4$ (anhydrite), $CaSO_4 \cdot 0.5\ H_2O$ (hemihydrate) and $CaSO_4 \cdot 2\ H_2O$ (gypsum spar). The first two modifications cure on addition of water, and are therefore inorganic binders, whereas gypsum spar does not cure. Instead, it may be used as a sulphate source in the said inorganic binders.

The above mentioned portland cement and/or portland composite cement is present in principle and is usefully included at more than 3 wt %, preferably at more than 10 wt % and more particularly at more than 25 wt % in cementitious system of the invention.

The shellac coating additionally comprises preferably more than 50 wt % shellac, more preferably more than 80 wt % and more particularly more than 95 wt %.

The cementitious system of the invention is further characterized in that the shellac coating comprises up to 10 wt %, preferably up to 5 wt %, of urea, based on the shellac fraction.

The cementitious system of the invention is further characterized in that the shellac coating usefully contains 0 to 30 wt %, preferably 0 to 15 wt % and more particularly 0 to 5 wt % of filler, based on the shellac fraction.

The said filler is usefully selected from natural or precipitated calcium carbonate, amorphous, crystalline or pyrogenic silicon dioxide, aluminum silicate such as, for example, kaolin or mica, magnesium silicate hydrate, aluminum hydroxide and magnesium hydroxide, and also mixtures thereof.

The release time of the accelerator is generally dependent on the degree of crosslinking of the shellac, the film thickness of the shellac coating, the accelerator content, the particle design, and the accelerator itself, and can be adapted to the particular application in the cementitious system.

The shellac of the invention is usefully present in a form in which it has been crosslinked by thermal treatment, treatment with microwaves, with electrical plasma, with high-energy particles and/or with ionizing radiation. The shellac is present preferably in a form in which it has been crosslinked by thermal treatment for 1 hour to 7 days, preferably for 1 hour to 2 days, at temperatures from 80° C. to 140° C., preferably from 100° C. to 120° C.

The cementitious system of the invention is characterized, furthermore, in that the accelerator is usefully selected from salts of elements from main groups I-III and also mixtures thereof, preferably from lithium salts, more particularly lithium sulphate, sodium salts and potassium salts, more particularly sodium silicates and potassium silicates and also waterglasses, magnesium salts, calcium salts, more particularly calcium chloride, calcium nitrate, calcium formate, calcium silicate, calcium silicate hydrate and ettringite, and also aluminum salts, more particularly sodium metaaluminate ($NaAlO_2$) and aluminum sulphate.

The accelerator particles ought to have an average particle diameter of 50 to 1000 μm, preferably of 100 to 300 μm, while the shellac coating of the accelerator particles ought to have an average thickness of 1 to 80 μm, preferably of 1 to 30 μm.

The roughness of the accelerator particles should be rather small. "Roughness" is a quantity which measures the irregularities of a surface, and is typically calculated using the distance, $y_i$, of the $i^{th}$ point on the surface (i=1, N) from the mean surface $y_0$ which is the arithmetic average of all $y_i$'s ($y_0 = (\Sigma_i y_i/N)$). Two of the most commonly used definitions for roughness are the average roughness and the root-mean-square roughness. The average roughness is defined as the average of $|y_0 - y_i|$ over the perimeter of the particle. The root-mean-square roughness is defined as the square root of the average of $|y_0 - y_i|^2$ over the perimeter of the particle. In any event, according to a presently preferred embodiment of the invention, the roughness (average roughness or root-mean-square roughness) of the particle is lower than 1 percent of the diameter of the particle, more preferably lower than 0.5 percent of the diameter of the particle, more preferably lower than 0.25 percent of the diameter of the particle.

The accelerator particles coated with crosslinked shellac suitably include at least two layers in a core/shell structure, with the core containing the accelerator and the coating containing the crosslinked shellac.

The cementitious system of the invention is preferably characterized in that the accelerator is applied on a carrier, adsorbed on a carrier, absorbed in a carrier or mixed with a carrier. The carrier in this definition is synonymous with the auxiliary used for the construction of the particle core. In the case of application, this carrier may for example be silica sand, glass beads or another unreactive, particulate substance with suitable grain size. In the case of adsorption or absorption, the carrier may for example be a particulate porous substance, such as kieselguhr, porous silicon dioxide, Circosil, a synthetic product comprising calcium silicate hydrate, cellulose particles, or a zeolitic material. Where the carrier is mixed with the accelerator, the carrier is for example calcium carbonate, talc or another auxiliary suitable for being shaped with the accelerator to form a suitable substrate.

The cementitious system of the invention is further characterized in that the accelerator particles additionally preferably comprise a layer for diffusion control and/or a blocking layer beneath the shellac coating. The diffusion control layer preferably comprises methylcellulose, while the blocking layer preferably comprises sodium sulphate. The advantage of a diffusion control layer is that the uptake of water and hence the time of the bursting of the coated accelerator particles owing to osmotic pressure are delayed. The advantage of a blocking layer made for example from sodium sulphate is that the possibly aggressive accelerator (such as $NaAlO_2$ for example) is not in direct contact with the chemically sensitive shellac.

Through skilled selection of the construction of the substrate for the accelerator particles, the active ingredient fraction can be varied, and so local overdosing of the cementitious system with accelerator can be avoided. Local overdosing ought to be avoided in order to prevent detrimental secondary reactions through subsequent activation as a result of excess accelerator.

The cementitious system of the invention is further characterized in that the accelerator particles coated with crosslinked shellac are present usefully at 0.1 to 5.0 wt %, preferably 0.3 to 3.0 wt % and more particularly 0.5 to 2.0 wt %, based on the inorganic binder.

The present invention accordingly further provides for the use of the additive component of the present invention for curing the cementitious component (i.e. the inorganic binder).

Lastly, the present invention further provides a cement slurry which comprises the cementitious system of the invention and water. This cement slurry suitably has a water/cement ratio (w/c) of 0.1 to 1.0, preferably of 0.2 to 0.7 and more particularly of 0.3 to 0.6.

BRIEF DESCRIPTION OF THE DRAWINGS

The present invention is now elucidated further using the examples below and referring to the appended drawings. In the drawings

EXAMPLES

Example 1

Reference

Figure 1:
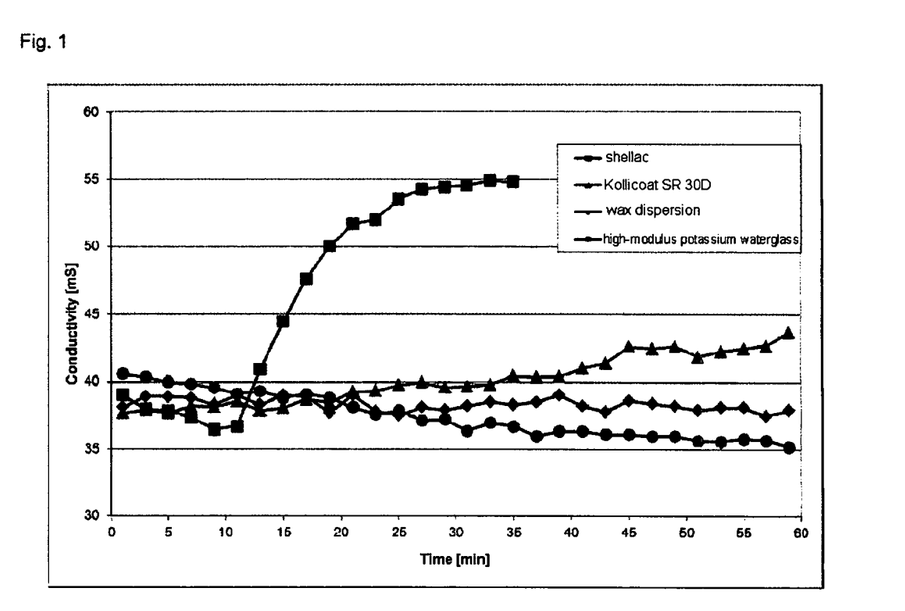
FIG. 1 shows the respective release characteristics of differently coated lithium sulphate particles in synthetic pore solution.

Apparent from FIG. 1 is the stepwise release characteristics exhibited in an alkaline medium by lithium sulphate particles coated with uncrosslinked shellac, in contrast to lithium sulphate particles coated with wax, polyvinyl acetate or waterglass. The lithium sulphate release was measured with a conductivity electrode in synthetic pore solution. This solution was a synthetically prepared alkaline solution having a pH of about 12.5 which was saturated with $Ca^{2+}$ and also contained $Na^+$, $K^+$ and $SO_4^{2-}$, resembling the pore solution expressed from a portland cement/water mixture. The substrate used comprised lithium sulphate particles with a size of 750 μm diameter, produced by extrusion and rounding on a rotary plate.

Example 2

Figure 2:
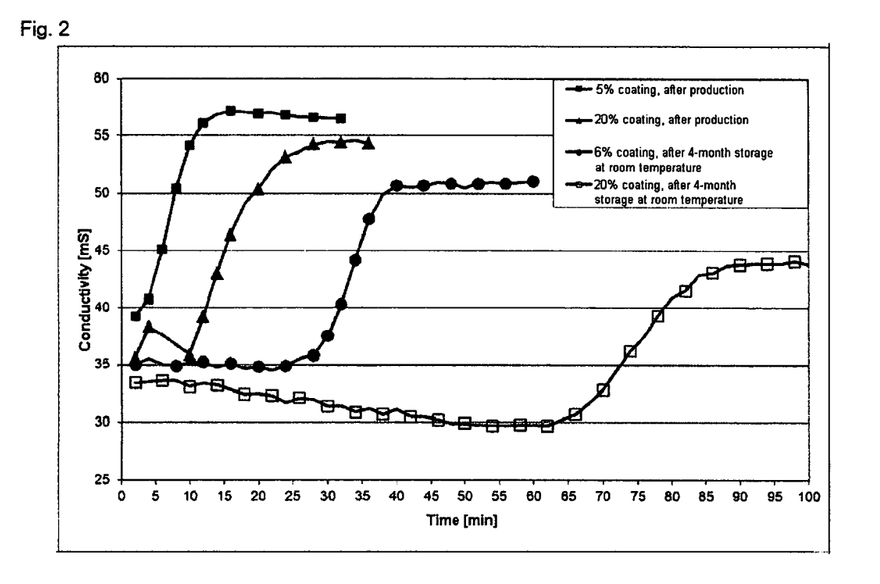
FIG. 2 shows the release characteristics of shellac-coated lithium sulphate particles after storage at room temperature.
Figure 3:
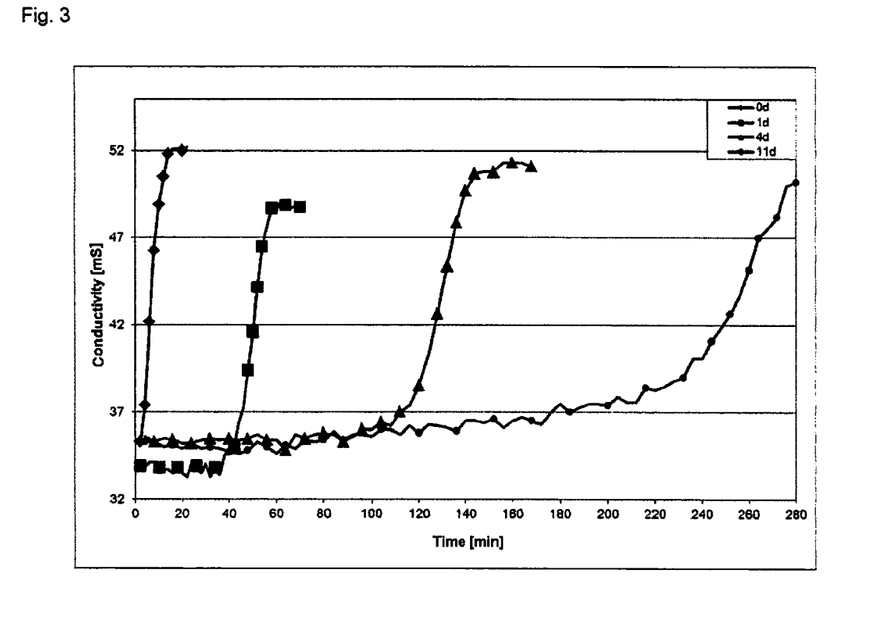
FIG. 3 shows the release of shellac-coated lithium sulphate carried on glass beads after thermal treatment for different times at 100° C.
Figure 4:
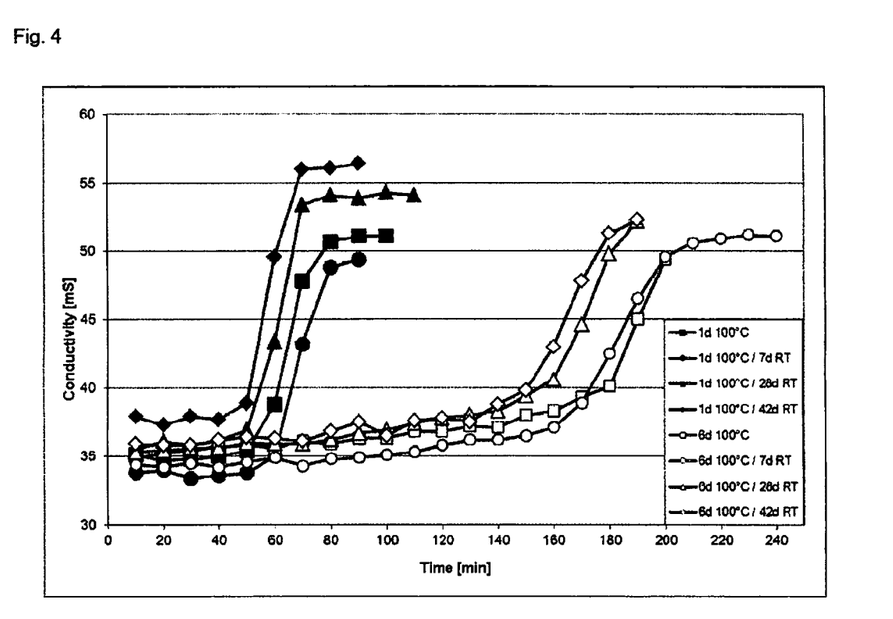
FIG. 4 shows the release of thermally aftertreated lithium sulphate particles with shellac coating after prolonged storage at room temperature.
Figure 5:
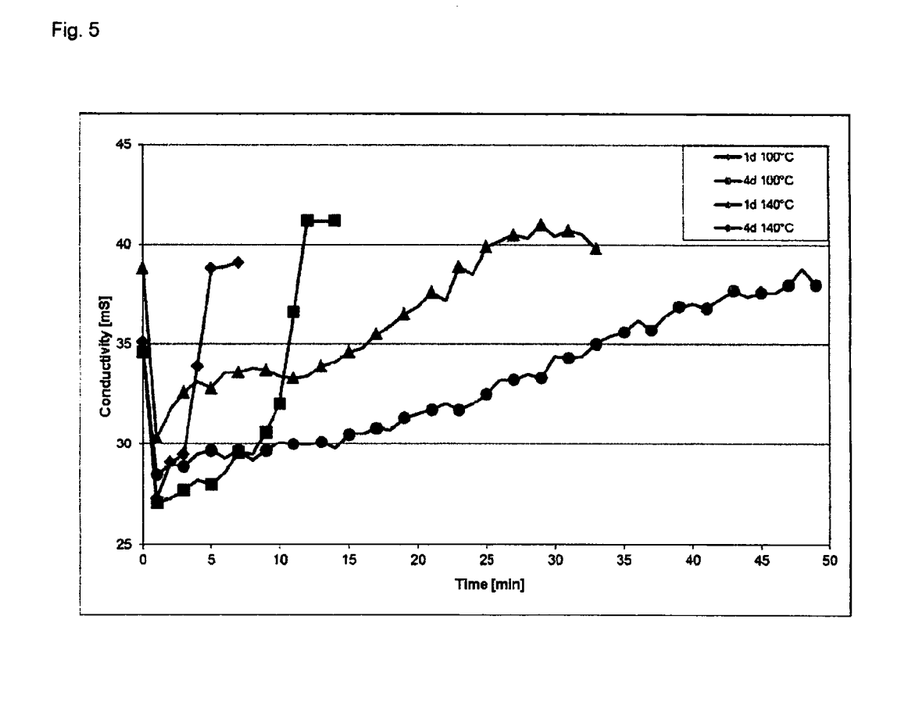
FIG. 5 shows the change in the release characteristics of shellac-coated particles as a function of the crosslinking conditions.

After prolonged storage at room temperature of the lithium sulphate particles coated with shellac, the release characteristics were indeed steplike as before, but the release time was significantly extended (FIG. 2), which indicated ageing of the coating. As it later emerged, the ageing involved subsequent esterification of the —OH and carboxyl groups in the shellac, in other words crosslinking. As it also became apparent, the crosslinking was promoted by single-day or multi-day storage at elevated temperature (100° C.)—see FIG. 3. Furthermore, after the thermal treatment, there was no longer any significant ageing, as shown by FIG. 4. If, instead, the shellac coating was carried out for too long or at too high a temperature, the coating lost its steplike release characteristics and underwent approximation to a diffusion-controlled release (FIG. 5).

Example 3

Stiffening was measured in a method based on DIN EN 1015-9 via the increase in force over time when a circular brass rod with a diameter of 6.175 mm is pressed to a penetration depth of 25 mm into a cementitious system. The weight values measured were converted to $N/mm^2$, assuming a figure of 10 $m/s^2$ for gravitational acceleration. The times at which penetration resistance values of 0.5 and 3.5 $N/mm^2$ were reached and exceeded were extrapolated from the adjacent values in each case and, in deviation from DIN EN 1015-9, were rounded to the nearest 5 minutes.

Figure 6:
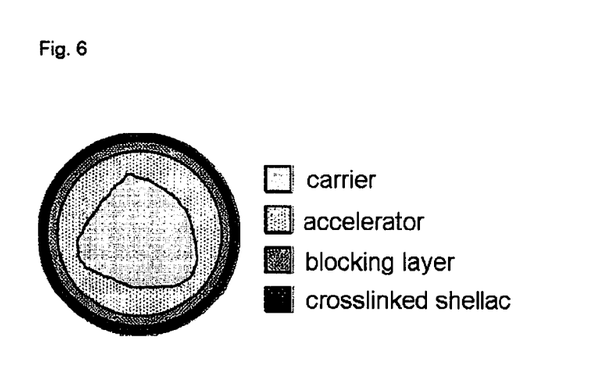
FIG. 6 shows the construction of a shellac-coated accelerator particle from Example 3.

The cementitious reference system used was as follows:
360 g water
800 g silica sand (BCS 412 from Strobel Quarzsande, average grain size 120 μm)
800 g cement (Milke CEM I 52.5R)
The accelerator used was as follows:
sodium metaaluminate (NaAlO$_2$), 53-55% Al$_2$O$_3$ content, finely ground, unstabilized, from BK Giulini, Ludwigshafen, Germany
sodium metaaluminate particles coated with crosslinked shellac and as produced below, with different release times of about 15 minutes, called "accelerator particles I" below, or of 45 minutes, called "accelerator particles II" below. The release times of accelerator particles I and II were measured via the change in conductivity in synthetic pore solution at room temperature.
The accelerator particles were produced in three steps:
Granulation
In a first step, sodium metaaluminate (53-55% Al$_2$O$_3$ content, finely ground, unstabilized from BK Giulini, Ludwigshafen) was shaped to granules with silica sand (BCS 412 from Strobel Quarzsande, average grain size 120 μm) and water in an intensive mixer from Eirich. In this process step, the sodium metaaluminate went onto the grains of sand, and largely rounded particles were formed. After the drying of the granules at 100° C., oversize and undersize outside the range of 200-300 μm were separated off by sieving.
Coating
The granules prepared were then transferred to a fluid-bed coater (Unilab from Bosch/Hüttlin, Germany), where they were coated first with sodium sulphate and then with shellac (SSB 57 from Ströver, Bremen, Germany) at a product temperature of about 30-35° C. The sodium sulphate solution used had a solids content of 15 wt %. Prior to coating, the shellac was dissolved in ammoniacal solution and adjusted to a solids content of 10 wt %.
Thermal Crosslinking
In this example, the crosslinking of the shellac was produced by storage of the accelerator particles at 100° C. for 24 or 75 hours. There is no difference in the constructions of accelerator particles I and II. For storage, the accelerator particles were mixed with a finely particulate inorganic powder (calcium carbonate) having an average particle size of about 5 μm in equal weight fractions, to prevent the particles sticking together during storage. After storage, the auxiliary was separated off again in a tumble sieve with a mesh size of <150 μm. The construction of accelerator particles I and II is shown in FIG. 6.
The average particle size of accelerator particles I and II was about 240 μm. The amounts in the coated accelerator particles were about 33 wt % silica sand, 33 wt % sodium metaaluminate, 12 wt % sodium sulphate (anhydrous) and 22 wt % shellac (figures rounded).
The reference system was batched in accordance with EN 196-1. The experiments and measurements were conducted at 23° C. and 50% relative atmospheric humidity, and the materials used and the test apparatus were equilibrated under these conditions for 24 hours. The zero point of the subsequent measurement was the time of the mixing of the cement with the batching water. The results are reproduced in Table 1. The proportion of accelerator is expressed in percent by weight, based on the weight of the cement. The respective penetration resistance is expressed in [N/mm$^2$]; times are expressed in minutes.

TABLE 1

Test results of the cementitious system, based on DIN EN 1015-9

| Proportion of accelerator | Penetration resistance after batching | Time taken to reach penetration resistance of 0.5 | Time taken to reach penetration resistance of 3.5 | Δt between penetration resistance 0.5 and 3.5 |
|---|---|---|---|---|
| 0.0% | 0.01 | 140 | 215 | 75 |
| 0.5% NaAlO$_2$ | 0.22 | 15 | 85 | 70 |
| 0.5% particles I | 0.01 | 100 | 180 | 80 |
| 0.5% particles II | 0.01 | 120 | 190 | 70 |
| 1.0% NaAlO$_2$ | not processable | not processable | not processable | — |
| 1.0% particles I | 0.01 | 55 | 110 | 55 |
| 1.0% particles II | 0.01 | 110 | 165 | 55 |

The example shows that accelerator particles I and II in accordance with the invention, in comparison to the uncoated accelerator, exhibit an extended processing life and an accelerated stiffening/solidification as compared with the reference system without accelerator. With a proportion of the accelerator of more than 1 wt %, furthermore, more rapid stiffening/solidifying can be observed.

The invention claimed is:

1. A cementitious system comprising a cementitious component and accelerator particles coated with crosslinked shellac, characterized in that the coated accelerator particles are present together with the cementitious component in the form of a one-component formulation and the shellac is in a crosslinked form obtained by thermal treatment of 1 hour to 7 days at temperatures of 80° C. to 140° C.

2. The cementitious system according to claim 1, characterized in that it is a dry mortar.

3. The cementitious system according to claim 1, wherein the cementitious component comprises an inorganic binder selected from portland cement, calcium aluminate cement, calcium sulphoaluminate cement, portland composite cement according to classes CEM II to V, hydraulic binders, latent hydraulic binders, pozzolanic binders, alkali-activatable aluminosilicate binders, gypsum, and mixtures thereof.

4. The cementitious system according to claim 3, characterized in that the portland cement and/or portland composite cement is present at more than 3 wt %.

5. The cementitious system according to claim 1, characterized in that the shellac coating comprises more than 50 wt % of shellac.

6. The cementitious system according to claim 1, characterized in that the shellac coating comprises up to 10 wt % of urea, based on the shellac fraction.

7. The cementitious system according to claim 1, characterized in that the shellac coating comprises 0 to 30 wt % filler, based on the shellac fraction.

8. The cementitious system according to claim 7, characterized in that the filler is selected from natural calcium carbonate, precipitated calcium carbonate, amorphous silicon dioxide, crystalline silicon dioxide, pyrogenic silicon dioxide, aluminium silicate, kaolin, mica, magnesium silicate hydrate, aluminium hydroxide, magnesium hydroxide, and mixtures thereof.

9. The cementitious system according to claim 1, characterized in that the shellac is in a crosslinked form obtained by thermal treatment of 1 hour to 2 days.

10. The cementitious system according to claim 1, characterized in that the accelerator is selected from salts of elements of main groups I-III and mixtures thereof, lithium salts, lithium sulphate, sodium salts, potassium salts, sodium silicates, potassium silicates, waterglasses, magnesium salts, calcium salts, calcium chloride, calcium nitrate, calcium formate, calcium silicate, calcium silicate hydrate, ettringite, aluminium salts, sodium metaaluminate ($NaAlO_2$), and aluminium sulphate.

11. The cementitious system according to claim 1, characterized in that the accelerator particles have an average particle diameter of 50 to 1000 μm.

12. The cementitious system according to claim 1, characterized in that the shellac coating of the accelerator particles has an average thickness of 1 to 80 μm.

13. The cementitious system according to claim 1, characterized in that the accelerator particles coated with cross-linked shellac comprise a core/shell structure, the core comprising the accelerator and the coating comprising the cross-linked shellac.

14. The cementitious system according to claim 13, characterized in that the accelerator has been applied to a carrier, adsorbed onto a carrier, absorbed in a carrier or mixed with a carrier.

15. The cementitious system according to claim 13, characterized in that the accelerator particles additionally comprise a layer for diffusion control, optionally of methylcellulose, and/or a blocking layer, optionally of sodium sulphate, beneath the shellac coating.

16. The cementitious system according to claim 1, characterized in that the accelerator particles coated with cross-linked shellac are present, based on the inorganic binder, at 0.1 to 5.0 wt %.

17. The cementitious system according to claim 1, characterized in that the shellac is in a crosslinked form obtained by thermal treatment at temperatures of 100° C. to 120° C.

18. The cementitious system according to claim 14, characterized in that the accelerator particles additionally comprise a layer for diffusion control, optionally of methylcellulose, and/or a blocking layer, optionally of sodium sulphate, beneath the shellac coating.

19. The cementitious system according to claim 11, characterized in that the accelerator particles have an average particle diameter of 100 to 300 μm.

20. The cementitious system according to claim 12, characterized in that the shellac coating of the accelerator particles has an average thickness of 1 to 30 μm.

* * * * *